G. H. BLAXTER.
SWAGING MILL.
APPLICATION FILED APR. 27, 1911.
Reissued Mar. 5, 1912.
13,377.
2 SHEETS—SHEET 1.
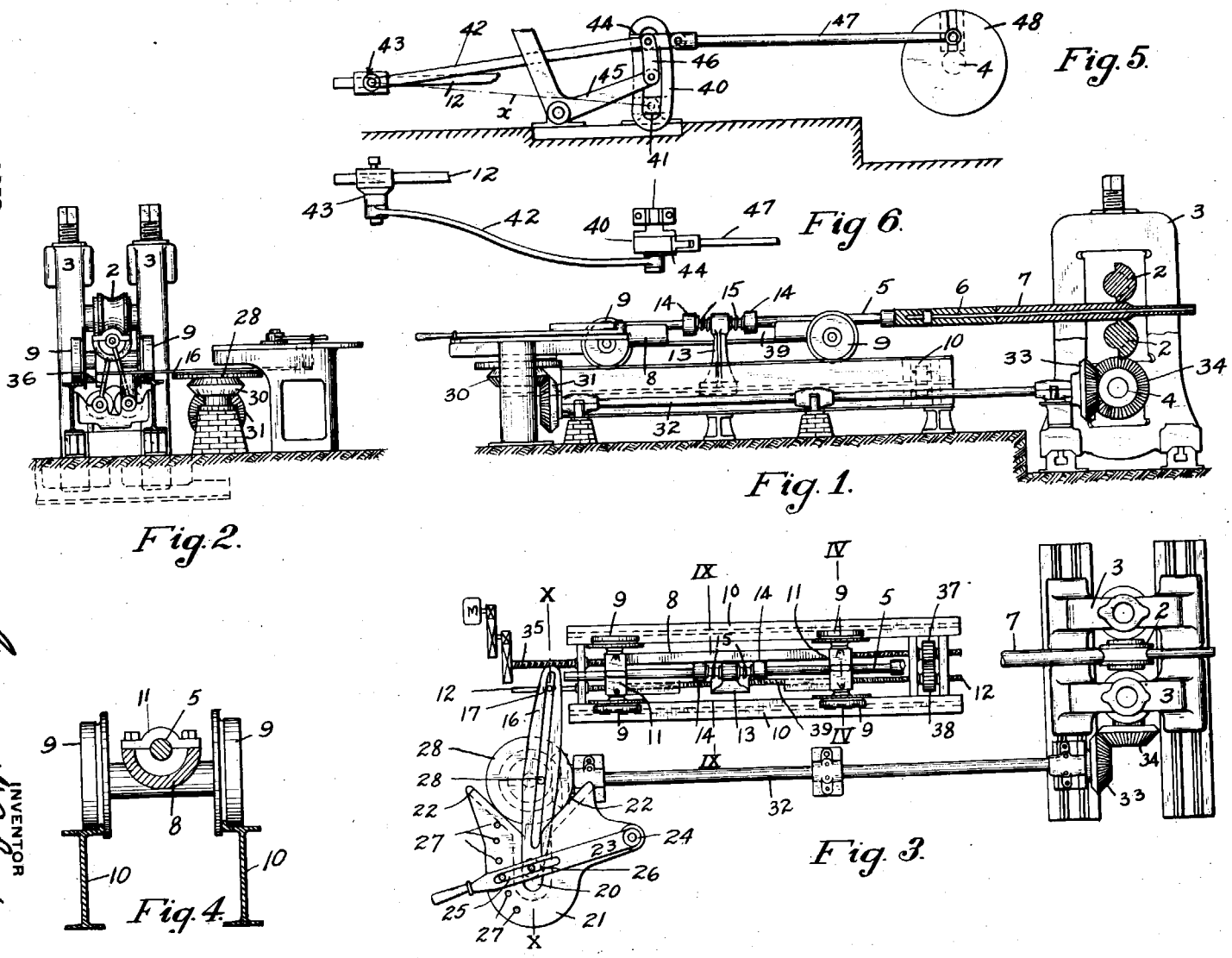
WITNESSES
Stephen Wach
W. C. Lyon
INVENTOR
George H. Blaxter
By Fredk H. Winter
Att'y.

G. H. BLAXTER.
SWAGING MILL.
APPLICATION FILED APR. 27, 1911.
Reissued Mar. 5, 1912.
13,377.
2 SHEETS—SHEET 2.
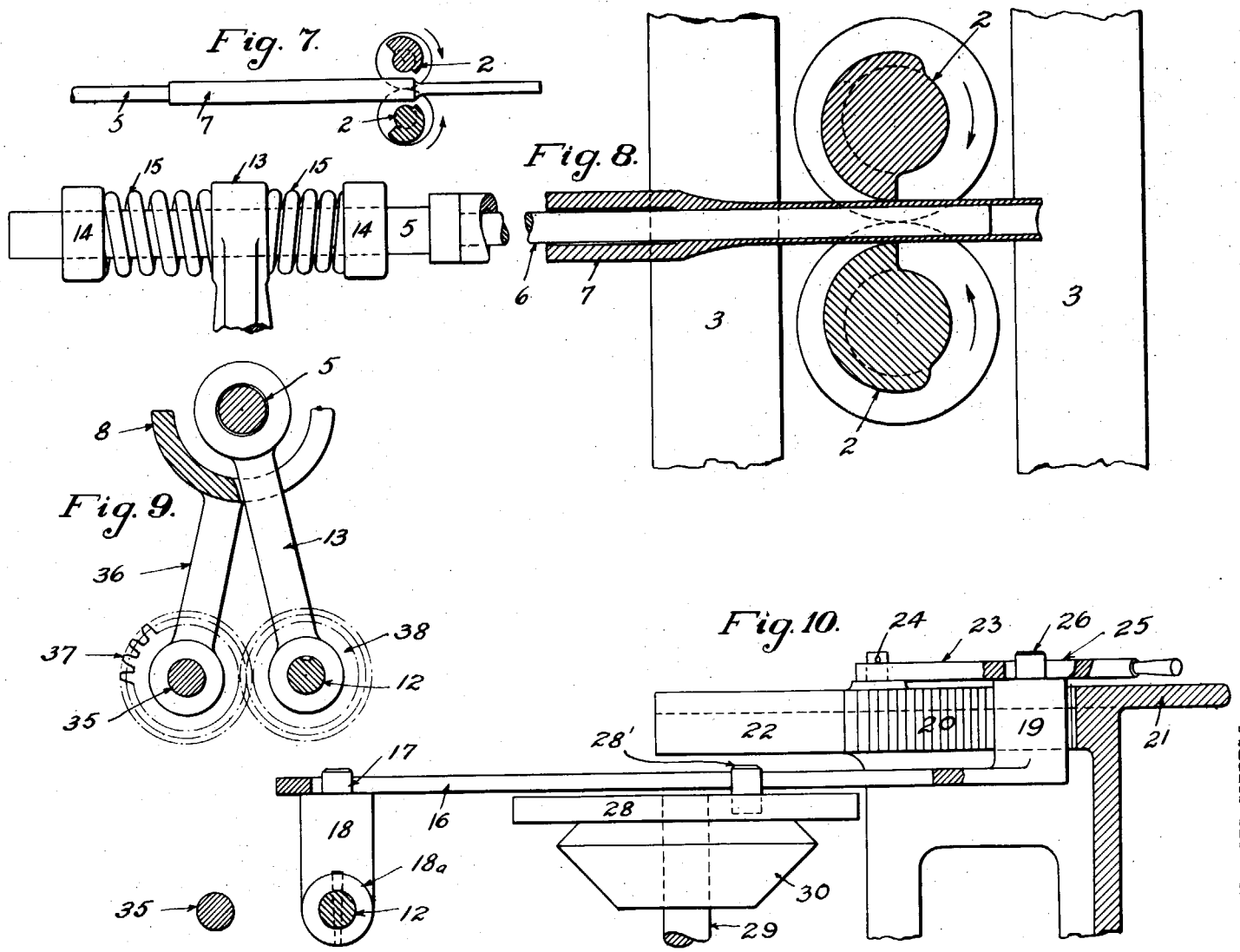
WITNESSES
Stephen Wach
W. C. Lyon
INVENTOR
George H. Blaxter
By Fred H. Winter
Att'y.

UNITED STATES PATENT OFFICE.

GEORGE H. BLAXTER, OF NEW BRIGHTON, PENNSYLVANIA, ASSIGNOR TO PITTSBURGH SEAMLESS TUBE COMPANY, OF BEAVER FALLS, PENNSYLVANIA, A CORPORATION OF PENNSYLVANIA.

SWAGING-MILL.

13,377. Specification of Reissued Letters Patent. Reissued Mar. 5, 1912.

Original No. 816,146, dated March 27, 1906, Serial No. 239,761. Application for reissue filed April 27, 1911. Serial No. 623,801.

*To all whom it may concern:*

Be it known that I, GEORGE H. BLAXTER, a citizen of Great Britain, residing at New Brighton, in the county of Beaver and State of Pennsylvania, have invented certain new and useful Improvements in Swaging-Mills, of which the following is a specification, reference being had therein to the accompanying drawings, forming part of the specification, in which—

Figure 1 is a view in side elevation of my improved reciprocating feed mechanism for swaging-mills; Fig. 2 is an end elevation thereof from the back end; Fig. 3 is a plan view of Fig. 1; Fig. 4 is a cross-sectional view on the line IV—IV of Fig. 3; Fig. 5 is a detail view in elevation, illustrating the use of a link for providing a variable feed; Fig. 6 is a partial plan view of Fig. 5; Fig. 7 is a sectional view showing the blank in position for action by the rolls; Fig. 8 is an enlarged sectional detail view showing the termination of the swaging operation; Fig. 9 is a vertical cross-sectional view, on an enlarged scale, indicated by the line IX—IX of Fig. 3; and Fig. 10 is a similar view indicated by the line X—X of Fig 3.

My invention refers to improvements in feeding mechanism for swaging-mills used in reducing blanks for seamless tubing and similar articles, and refers particularly to the means for imparting movement to the mandrel-bar and blank thereon in conformity with the operation of the swaging-mill and with the normal backward travel of the blank under the action of the rolls.

The successful operation of the invention depends upon the coöperation of the actuating mechanism with the operation of the swaging-rolls, and it is designed to work in unison therewith, for which purpose it is essential that the blank-actuating mechanism shall be either so connected directly with the roll-driving machinery that such corresponding unison is produced or that the blank-actuating mechanism shall be controlled so as to conform with the operation of the rolls if independent driving means are employed. In the drawings I have shown the mechanism as actuated directly from the roll-driving gearing in the manner hereinafter described and as illustrated in the drawings. Referring thereto, 2—2 are the upper and lower swaging-rolls, mounted in suitable housings 3 and driven through suitable gearing from a power-shaft 4, the rolls 2 being continuously operated in the direction of the arrows in the manner customary with this class of reducing-rolls.

5 is the mandrel-carrying bar, upon the forward end of which is mounted the mandrel 6, on which the blank 7 is carried. In the operation of swaging this blank is extended forwardly between the rolls during their inoperative or open period and is grasped by them and reduced sectionally at each operation, during which the blank is projected backwardly, being then advanced a corresponding distance forwardly plus an additional distance equivalent to the amount of the next reduction produced by the "bite" of the rolls. Ordinarily this operation is secured through mechanism either operated by hand or with feeding devices provided with a spring adapted to project the mandrel inwardly against a limiting-stop. My invention is designed to feed the blank both forwardly and backwardly, conforming as closely as possible to the backward travel produced by the rolls and also providing the necessary additional forward feeding travel. For this purpose I have provided a carriage or buggy 8, mounted upon wheels 9, traveling on a supporting track or frame 10, which may conveniently consist of I-beams or other structural elements. The mandrel-bar 5 has a sliding support in bearings 11 at each end of the carriage and is reciprocated backwardly and forwardly in conformity with the roll operation by means of a reciprocating thrust-shaft 12, having a longitudinal sliding bearing in the frame 10 and connected with the mandrel-bar 5 by a yoke 13, which is threaded and engages the threaded thrust-shaft 12. At its upper end yoke 13 slidingly engages the mandrel-carrying bar 5 between abutments 14—14, intervening cushioning-springs 15 being provided of equal strength at each side between the head of the yoke 13 and said abutments. It will thus be seen that as the yoke is caused to travel forwardly and backwardly it will impart a corresponding reciprocating motion to the mandrel-bar and blank, while springs 15 will provide for a certain amount of independent compensating motion of the mandrel-bar independent of the yoke 13 itself. Reciprocating motion is imparted to thrust-shaft 12, yoke 13, and the mandrel-carrying bar 5 by means of a slotted arm or lever 16, engaging a pin 17, extending upwardly from a stud 18, loose on shaft 12 between collars 18ª secured thereto, the other end of arm 16 being slidingly pivoted by an adjustable fulcrum-neck 19 in slot 20 of guiding-plate 21. The sides forming slot 20 are of a length sufficient to allow of a range of movement of neck 19 in and out toward the actuating-pin of the driving-crank sufficient to provide for the necessary variations in the throw of the slotted arm, and at the termination of said slot the sides diverge, as shown at 22. For the purpose of shifting the slotted arm 16, so as to vary the relative location of its adjustable fulcrum 19, I employ a lever 23, pivoted at 24 on a stud extending up from plate 21 and having a slot 25, engaging a stud or pin 26 of the fulcrum-neck 19. When it is desired to entirely stop the reciprocation of the thrust-shaft 12, the neck 19 is thrown entirely out of slot 20 and may be readily replaced therein by means of the converging flaring sides 22—22.

A series of limiting stops or pins 27 are arranged in the form of an arc, with which the slotted lever 23 may be connected at varying positions, as clearly shown in Fig. 3, thus locating the working position of fulcrum-neck 19, according to the desired stroke. By this construction I am enabled to vary the stroke of the mandrel-bar and blank independently of the feed-travel, or to stop the stroke at will by disconnecting the slotted lever 23 from pin 27 and throwing the fulcrum-neck 19 entirely out of slot 20. This is especially desirable, as it enables the operator to change the stroke to suit varying conditions of size, etc., and also to shorten the feed at the commencement of the operation and gradually lengthen it as the operation proceeds until the blank is drawn out under the full action of the operative faces of the swaging-rolls.

28 is a driving crank disk or arm having a wrist pin or stud 28′ extending into a slot in arm 16, the disk 28 being mounted upon a vertical shaft 29, driven through gearing 30—31, shaft 32, and gearing 33—34 from power-shaft 4 of the rolls. By this means the arm 16 is oscillated in unison with the operation of the rolls, imparting a corresponding reciprocation to the mandrel in the manner desired. The crank disk 28 imparts to the thrust-shaft 12 alternately rapid and slow motions, due to the movement of the wrist pin 28′ in a path eccentric to the axis of oscillation of the lever 16. Diametrically opposite quadrants of the disk 28 lie substantially parallel to the general direction or length of the lever 16, while the other two diametrically opposite quadrants are substantially transverse to or in a general line with the oscillating movement thereof. As a consequence, when the blank is free from the grip of the swaging rolls the crank mechanism moves the blank forwardly rapidly for a certain distance, and as the crank approaches its dead center, the movement of the blank slows down, so that when the rolls again grip the blank the latter is practically not traveling forwardly at all, or at most, at a very slow speed. Consequently the jarring shocks which occur where the blank and mandrel are fed forward at constantly accelerated speed by means of springs, as in the usual practice, are entirely overcome. The simple crank mechanism whose wrist pin moves in a circle eccentric to the axis of oscillation of the lever for actuating the thrust-shaft is admirably adapted for not only positively feeding the blank to the rolls, but in a manner to entirely overcome the shocks which usually occur. As the mandrel and blank advance during the operation of swaging it is necessary to also advance the carriage 8, carrying the mandrel-bar, and for this purpose I employ a secondary threaded shaft 35, journaled in suitable bearings in the frame 10, which shaft engages, by its threads, the threaded hub of an arm 36, secured to or integral with the carriage 8. Shafts 12 and 35 are designed to be driven together by suitable means and are preferably provided with right and left hand threads and rotated in opposite directions by intermeshing gears 37, 38, gear 37 being keyed to shaft 35 and gear 38 having a spline engagement with the shaft 12. Both shafts are thus rotated together and driven by any suitable means, as a motor M and gearing connected with the shaft 35, as shown in Fig. 3, or by other suitable mechanism driven at the desired speed to secure proper feed. It will be understood that the speeds of the threaded shafts are regulated to impart the proper forward feed to the carriage 8 and to yoke 13, which thus keeps apace with the carriage in its forward travel along the frame, the side of the carriage being cut out or slotted, as at 39, for clearance.

In Figs. 5 and 6 I have illustrated a modified construction for imparting a variable stroke to the thrust-shaft 12 by utilizing the well-known link motion used with the valve mechanism of reversing engines. 40 is a link pivoted at 41, which point also corresponds to the dead-center of the thrust-shaft pitman 42. This pitman 42 is pivotally connected to a stud 43, connected with the thrust-shaft, as shown, the other end being similarly connected with an adjustable block 44, mounted in the slot of the link, in which it is raised and lowered by any suitable means, as a lever 45, and connecting-link 46, the lever being under control of the operator by any suitable operating connections. The link is given its full throw at one end by the connecting-rod 47 and crank disk or arm 48, mounted on main shaft 4, or directly connected with the roll-driving gearing or correspondingly operating means, in any convenient manner. The advantage of the link motion is that is provides for very delicate and simple adjustment of the throw from a maximum to a minimum and also for immediately throwing the pitman 42 to a stationary position without appreciable shock.

The operation is as follows: Reciprocation of shaft 12 by arm 16 or link 40 advances the blank inwardly to the proper initial position between the rolls, which then engage it, causing it to travel outwardly in a reverse direction, arm 16 or link 40 at the same time withdrawing shaft 12 and producing the same reverse travel of the mandrel-bar 5. Springs 15 compensate for any lost motion or irregularity, while being sufficiently stiff to insure practically positive travel. Rotation of shafts 12 and 35 causes the reciprocating yoke 13 to gradually advance independently of its reciprocation and causes the carriage 8 to also gradually advance in conformity with such travel, the forward travel of both conforming to the reduction produced by the rolls. By this means an independent in-and-out movement is given to the blank, which is thus actuated in both directions entirely independently of the movement imparted to it by the rolls themselves, but in entire harmony and conformity therewith. The crank mechanism for imparting this reciprocating movement to the blank moves the same forwardly very rapidly and then more slowly, so that there is little or no forward movement to the blank at the time when the swaging rolls grip the same. I thus avoid all jarring or shocks and overcome any inaccuracy of feed, thus contributing to regularity of operation, economy of labor, and considerably improve the character of the work being performed. It will be seen that the stroke of the arm 16 and consequent reciprocation of the blank may be varied within wide limits by adjustment of the fulcrum-neck 19 or block 44, or that the motion may be entirely stopped and the machine rendered inoperative as to reciprocation of the mandrel-bar by merely lifting said arm away from engagement with the pivotal stud 27 and throwing the neck out of the slot 20, or by throwing block 44 to the dead-center of the link, the pitman assuming the position $x$. A further advantage of the variable feed is that at the commencement of the operation the length of reciprocation of the mandrel-bar may be reduced to a very short stroke corresponding to the short initial reductions of the rolls, the stroke being gradually increased to the full necessary travel, which is then maintained during the remainder of the operation.

While the construction which I have shown is well adapted for the purpose in view, it is obvious that other mechanism may be employed to produce the reciprocations of the mandrel-bar—as, for instance, a crank, eccentric, or cam construction operated by suitable gearing from the roll-driving shaft, or other forms of link motion between a driving mechanism and the mandrel—so as to permit the stroke of the mandrel to be varied or stopped at will.

Various other changes or modifications may be made by the skilled mechanic in the design, proportions, or various details of construction without departing from the invention.

What I claim is:

1. A horizontally-traveling mandrel-supporting carriage and a mandrel-bar supported therein, with means for advancing the carriage, and means engaging the mandrel-bar for advancing it and independently reciprocating it, substantially as set forth.

2. A horizontally-traveling mandrel-supporting carriage and a mandrel-bar supported therein, with means for advancing the carriage and means engaging the mandrel-bar for advancing it and independently reciprocating it, with means for varying the stroke of the mandrel-bar, substantially as set forth.

3. The combination with swaging-rolls and driving means therefor; of a horizontally-traveling mandrel-supporting carriage and a mandrel-bar supported therein, means for advancing the carriage, means for advancing the mandrel-bar, and means operating in correspondence with the rolls for reciprocating the mandrel-bar, substantially as set forth.

4. The combination with a carriage and a reciprocable mandrel-bar carried thereby; of a support for the carriage, a longitudinally-stationary feeding-screw arranged to propel the carriage, a screw arranged to reciprocate the mandrel-bar and to feed it in conformity with the travel of the carriage, means for reciprocating said screw, and means for turning both screws, substantially as set forth.

5. The combination with a carriage and a reciprocable mandrel-bar carried thereby; of a support for the carriage, a longitudinally stationary feeding-screw arranged to propel the carriage, a screw arranged to feed the mandrel-bar in conformity with the travel of the carriage, means for reciprocating said screw and mandrel-bar, means for turning both screws, and means for varying the reciprocable travel of the screw, substantially as set forth.

6. The combination with swaging-rolls and driving means therefor; of a horizontally-traveling mandrel-supporting carriage and a mandrel-bar supported therein, means for advancing the carriage, means for advancing the mandrel-bar, and means in driving engagement with the rolls for reciprocating the mandrel-bar, substantially as set forth.

7. The combination with a carriage and a reciprocable mandrel-bar carried thereby; of a support for the carriage, a longitudinally-stationary feeding-screw engaging a nut secured to the carriage, and a reciprocable screw engaging a nut connected with the mandrel-bar, with means for turning the screws together and means for independently actuating the reciprocating screw longitudinally, substantially as set forth.

8. The combination with swaging-rolls and driving mechanism therefor; of a supporting-frame, a carriage mounted thereon, a longitudinally-movable mandrel-bar mounted in said carriage, a longitudinally-stationary feeding-screw in operative engagement with the carriage, a reciprocable feeding-screw in operative engagement with the mandrel-bar, means for rotating the screws together, and means connected with the roll-driving mechanism for independently reciprocating the mandrel-bar-actuating screw, substantially as set forth.

9. The combination of a supporting frame, a carriage mounted thereon, a longitudinally-movable mandrel-bar mounted in said carriage, a longitudinally-stationary feeding-screw in operative engagement with the carriage, a reciprocable feeding-screw in operative engagement with the mandrel-bar, means for rotating the screws together, means for independently reciprocating the mandrel-bar-actuating screw, and means for varying the stroke thereof, substantially as set forth.

10. The combination of a supporting-frame, a carriage mounted thereon, a longitudinally-movable mandrel-bar mounted in said carriage, a longitudinally-stationary feeding-screw in operative engagement with the carriage, a reciprocable feeding-screw in operative engagement with the mandrel-bar, means for rotating the screws together, and an actuating-lever connected with the reciprocable screw, with means for varying the effective stroke of said lever, substantially as set forth.

11. The combination with swaging-rolls and driving means therefor; of a carriage and a mandrel-bar supported thereon, means for propelling the carriage and mandrel-bar, and means for independently and positively reciprocating the mandrel-bar in both directions, said means being connected with the roll-driving means, substantially as set forth.

12. The combination with swaging-rolls and driving means therefor; of a supporting-frame, a carriage mounted thereon, a longitudinally-movable mandrel-bar mounted in said carriage, a longitudinally-stationary feeding-screw in operative engagement with the carriage, a reciprocable feeding-screw in operative engagement with the mandrel-bar, means for rotating the screws together, an actuating-link connected with the reciprocable screw, means for varying the effective stroke of said link, and a crank device in operative engagement with said link, with means for actuating the crank device in driving engagement with the driving means for the swaging-rolls, substantially as set forth.

13. The combination with a horizontally-traveling mandrel-supporting carriage and a mandrel-bar supported therein, means for advancing the carriage, and means engaging the mandrel-bar for advancing it and independently reciprocating it; of a lever incorporated with said reciprocating means and adjusting devices arranged to vary the effective stroke thereof, substantially as set forth.

14. In a tube swaging mill, the combination with rotating swaging-rolls, of a mandrel, mechanism operated in unison with the rolls for reciprocating the mandrel and moving it into the rolls, and independent mechanism for slowly advancing the mandrel.

15. In a tube swaging mill, the combination with rotating swaging-rolls, of a mandrel, mechanism actuated from the rolls for reciprocating the mandrel and moving it into the rolls, and an independently actuated screw for slowly advancing the mandrel.

16. In a tube swaging mill, the combination with segmental swaging members, of actuating means therefor, a mandrel, and mechanism for reciprocating said mandrel comprising a driver moving in a circular path and operative connections therefrom to the mandrel, whereby the latter is given alternately fast and slow movement.

17. In a tube swaging mill, the combination with segmental swaging members, and actuating means therefor, of a mandrel, and mechanism operated in unison with the swaging members for reciprocating the mandrel, said mechanism being arranged to impart to the mandrel alternately fast and slow movement.

18. In a tube swaging mill, the combination with rotating segmental swaging rolls, of a mandrel, mechanism actuated from said rolls for reciprocating the mandrel, said mechanism including a driver moving in a circular path, and a lever actuated thereby and operatively connected to the mandrel whereby the latter is given a fast and slow movement.

19. The combination with segmental swaging rolls, of actuating means therefor, a work-carrying mandrel, and means for reciprocating said mandrel comprising, a driver mounted to rotate in a segmental path on an axis perpendicular to the direction of movement of the mandrel, operative connections therefrom to the mandrel, and connections between the driver and the rolls, the rolls and connections being so arranged that the mandrel is fed quickly into position between the rolls and with reduced speed at the time of engagement of the rolls with the work.

In testimony whereof, I affix my signature in the presence of two witnesses.

GEORGE H. BLAXTER.

Witnesses:
NEWTON P. ANDRE,
WILLIAM M. WYLIE.